Patented Sept. 5, 1933

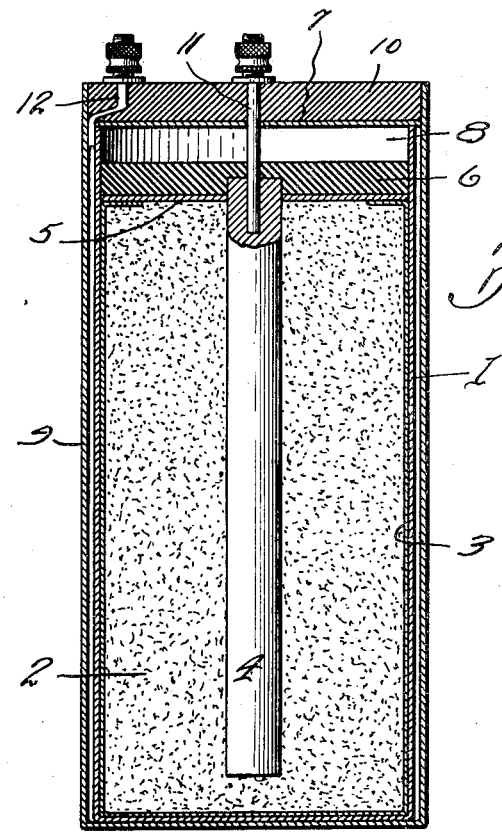
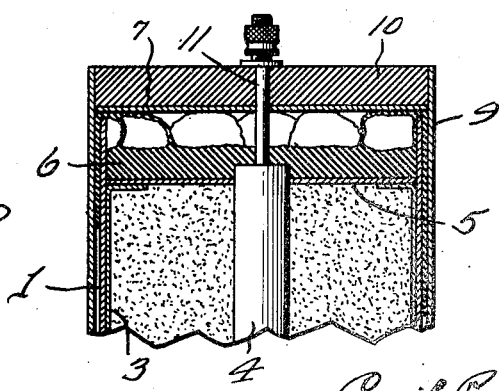

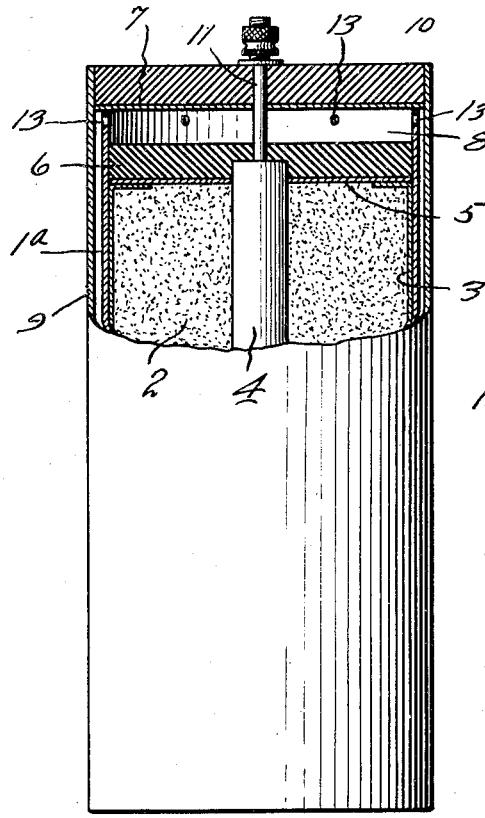
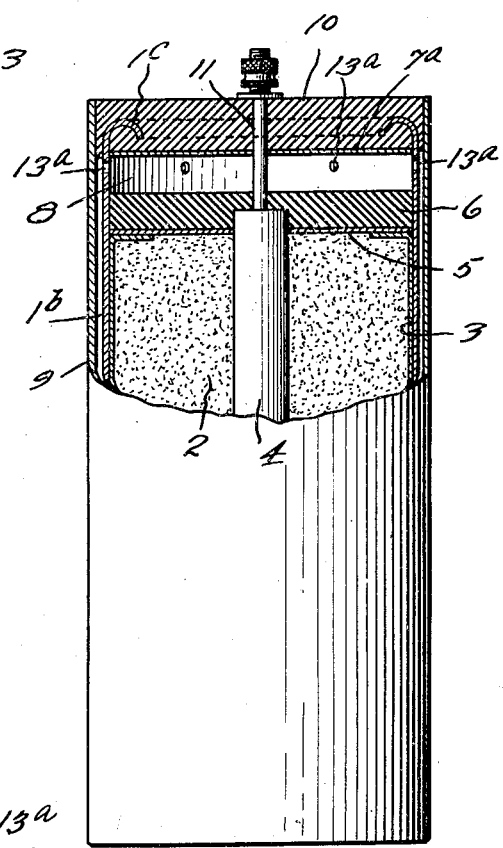
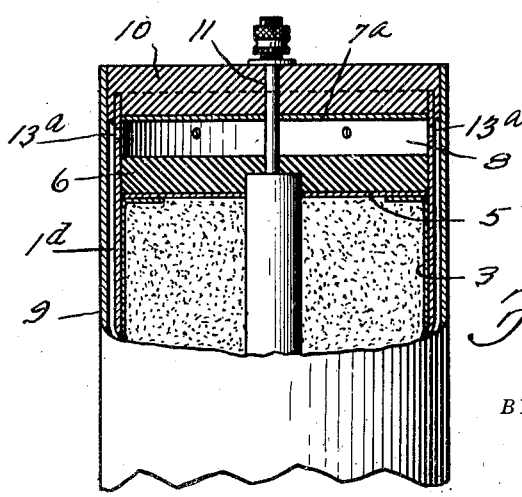

1,925,374

UNITED STATES PATENT OFFICE 1,925,374

DRY CELL BATTERY AND SEAL THEREFOR

Cyril P. Deibel, Lakewood, Ohio

Application September 11, 1930
Serial No. 481,137

7 Claims. (Cl. 136—133)

This invention relates to dry cell batteries and while the embodiment of the invention herein disclosed relates primarily to batteries which are generally known as "six-inch cells", the invention is of general application.

Heretofore, the efficiency as well as the shelf life of dry cell batteries has been materially impaired due to what is known as "gassing" or "breathing" of the cells which results in a drying out of the materials forming the cells and a general decrease in efficiency and shelf life of the battery.

The main object of this invention, therefore, is to provide a dry cell of the character described in which this "gassing" or "breathing" is reduced to a minimum and substantially eliminated.

A further object of the invention is to provide a dry cell of the character described embodying a zinc container containing a mass of depolarizing mix which is insulated from the container and is covered with a layer of plastic sealing material.

A still further object of the invention is to provide a dry cell of the character described in which the zinc can is enclosed within an outer carton or casing, which carton or casing is sealed at its upper end in such a manner as to permit the plastic sealing material to escape from the cell and flow downwardly between the outer carton and zinc can, the seal for the outer carton or casing being spaced from the plastic sealing material so as to provide an expansion chamber above the mix.

Further and more limited objects of the invention will appear as the description proceeds and by reference to the accompanying drawings in which Fig. 1 is a vertical sectional view disclosing the preferred embodiment of my invention; Fig. 2 is a vertical sectional view similar to Fig. 1 slightly exaggerated to more clearly disclose the manner in which the sealing material tends to bubble and escape and flow outwardly between the zinc container and outer casing; and Figs. 3, 4 and 5 are fragmentary sectional views slightly exaggerated illustrating three modified forms of my invention.

Referring now to the drawings, the reference character 1 designates a metal container which is preferably circular in shape and formed of zinc and in which is arranged a mass 2 of depolarizing mix which is insulated from the zinc can by means of a suitable liner 3 formed of paper or other suitable material. Arranged centrally thereof is a carbon electrode 4. Covering the mass of mix and surrounding the carbon electrode 4 is a disk or washer 5. Covering the mass of mix and washer 5 is a layer of sealing material 6 preferably soft tar or pitch which bonds with the zinc container and preferably completely covers the end of the carbon electrode. Covering the upper end of the zinc container is a second disk or washer 7 which is spaced from the washer 5 a slight distance so as to provide an expansion chamber 8.

Enclosing the zinc can is an outer carton or casing 9 which is preferably formed of paper of such size that the can fits loosely therein. The upper edge of the outer carton or casing extends a considerable distance above the upper edge of the zinc can. Sealing the upper end of the outer casing is a layer 10 of hard sealing material which bonds with the outer container.

Secured to the carbon electrode 4 is a brass dowel 11 which extends through the upper seal 10 and provides a suitable terminal. Secured to the zinc can is a brass dowel 12 which is preferably soldered to the zinc can and has its upper end bent at an angle and extending through the upper seal 10. The terminals 11 and 12 may be of either the spring or screw type. It will be noted that the upper end of the terminal 12 is spaced from the edge of the outer casing or jacket.

When excessive pressure is obtained in the cell, the gas bubbles up through the plastic pitch into the expansion chamber 8. The pitch flows together after the bubble of gas has escaped and seals what would otherwise remain a permanent channel which would permit air to enter the cell. This layer of plastic sealing material has a tendency to bubble as the gas escapes therethrough and these bubbles tend to grow larger and to escape from the zinc can. As the upper seal 10 bonds with the cardboard jacket or casing, this bubble cannot escape outside of the cell and will tend to escape over the upper edge of the zinc can past the upper disk or washer 7 and will flow downwardly in the space between the zinc can and the outer carton or casing, somewhat as illustrated in Fig. 2. This tar or pitch has no harmful effect upon the cell and tends to collect in this space since the upper seal is such that it cannot escape outside of the cell.

In Fig. 3 there is disclosed a slightly modified form of my invention in which the zinc can 1ᵃ is provided about its upper peripheral edge with a plurality of small openings or vents 13 through which the soft seal may escape when excessive pressure is obtained in the cell. This form of invention is otherwise identical with the form of the invention disclosed in Figs. 1 and 2.

In Fig. 4 there is disclosed a second modification of my invention in which the zinc can 1ᵇ has its upper edge bent over inwardly as shown at 1c and is also provided with vents or openings 13a at the upper portion thereof slightly below the upper disk or washer 7a which, in this case, fits within the can. In this form of the invention, the upper edge of the can is embedded in and surrounded by the upper seal 10 and the soft seal may escape through the openings or vents 13a when excessive pressure is obtained in the seal. This form of the invention is otherwise identical with the form of invention shown in Fig. 3.

In Fig. 5 there is disclosed a third modification of my invention which is substantially identical with the form of invention shown in Fig. 3 except that the upper end of the zinc can 1d projects upwardly into the upper seal and is surrounded thereby. The upper disk or washer 7a fits within the can instead of resting upon the top edge of the can, as shown in Figs. 1 and 2.

The dry cells herein disclosed are especially advantageous and useful when the cells are to be placed upon their sides as there is more of a tendency of the soft seal to escape when the cells are in this position. It will now be clear that I have provided a dry cell and seal therefor which will accomplish the objects of the invention as hereinbefore stated. Throughout the claims of this application the expression "plastic sealing material" is used to define the layer of sealing material indicated by the reference character 6 which is formed of soft tar or pitch or similar material which will bond with the sides of the zinc container and permit excessive pressure within the cell to pass therethrough without leaving permanent channels therein. Such a seal will permit the excessive pressure to be relieved and yet prevent the ingress of outside air into the cell.

Various changes may be made in the details of construction as well as in the materials used, without departing from the spirit of my invention. The embodiments of the invention herein disclosed are merely illustrative and are not to be considered in a limiting sense.

Having thus described my invention, what I claim is:

1. A dry cell comprising a can, a carbon electrode and a mass of depolarizing mix arranged within said can and insulated therefrom, a lower layer of plastic sealing material completely covering the top of said mass of mix and carbon electrode, an outer casing enclosing said can and extending above the upper edge thereof, an upper layer of sealing material sealing the upper end of said outer casing and means enabling the plastic sealing material to escape between the can and outer casing.

2. A dry cell comprising a can containing a carbon electrode and a mass of depolarizing mix insulated from the can, a lower layer of plastic sealing material completely covering the top of said mass of mix and carbon electrode and bonded with the wall of said can, an outer casing enclosing said can and extending above the upper edge thereof, an upper layer of sealing material covering and closing the upper end of said outer casing and means enabling the plastic sealing material to escape between the can and outer casing, said upper layer of sealing material being spaced from the layer of plastic sealing material and bonded with said outer casing and completely sealing the same.

3. A dry cell comprising a can containing a carbon electrode and a mass of depolarizing mix insulated from the can, a layer of plastic sealing material completely covering the top of said mass of mix and carbon electrode and bonded with the wall of said can, an outer casing enclosing said can and extending above the upper edge thereof, an upper layer of sealing material covering and closing the upper end of said outer casing and means enabling the plastic sealing material to escape between the can and outer casing, and terminals connected with said can and carbon electrode respectively and spaced from said outer casing at the upper ends thereof.

4. A dry cell comprising a zinc container in which is arranged a carbon electrode and a mass of depolarizing mix, a lower layer of plastic sealing material completely covering the top of said mass of mix and carbon electrode, an outer casing enclosing said container and extending above the upper edge thereof, an upper layer of sealing material sealing the upper end of said outer casing and means enabling said plastic sealing material to escape between the can and outer casing, said lower layer of sealing material being of such a character as to permit excessive pressure in the cell to be relieved and to prevent ingress of air into the cell therethrough.

5. A dry cell comprising an inner metal container in which is arranged a carbon electrode and a mass of depolarizing mix, a lower layer of plastic sealing material completely covering the top of said mass of mix and carbon electrode and bonded with the walls of said container, an outer carton enclosing said container and extending above the upper edge thereof, an upper layer of sealing material closing said outer carton and spaced from said lower layer of sealing material, means enabling said plastic sealing material to escape into the space between said inner container and outer carton below said upper layer of sealing material, said lower layer of sealing material being of such character as to permit excessive pressure within the cell to be relieved and to prevent ingress of air into the cell therethrough.

6. A dry cell comprising a metal can containing a carbon electrode and a mass of depolarizing mix insulated from said can, a layer of plastic sealing material completely covering said carbon electrode and mass of mix and bonded with the walls of said can, a carton enclosing said can and extending above the upper edge thereof, a layer of hard sealing material sealing the said carton, a terminal connected with said carbon electrode and extending through said upper seal, a second terminal connected with said can and extending through said upper seal and having its upper portion spaced from said carton.

7. A dry cell comprising a can, a carbon electrode and a mass of depolarizing mix arranged within said can and insulated therefrom, a lower layer of plastic sealing material completely covering said mass of mix and carbon electrode, an outer casing enclosing said can and extending above the upper edge thereof, an upper layer of sealing material closing the upper end of said outer casing and spaced from said lower layer of sealing material and means enabling said plastic sealing material to escape between the can and outer casing.

CYRIL P. DEIBEL.